3,397,186
TRIAMINOGUANIDINIUM SALTS OF 5 - VINYL TETRAZOLE POLYMERS AND A METHOD FOR THEIR PREPARATION
Robert Edward Torley, Wilton, and George Sidney Sprague, Stamford, Conn., assignors to American Cyanamid Company, Stamford, Conn., a corporation of Maine
No Drawing. Filed Apr. 12, 1966, Ser. No. 543,488
4 Claims. (Cl. 260—78.4)

ABSTRACT OF THE DISCLOSURE

Triaminoguanidinium salts of 5-vinyltetrazole polymers and a method for their preparation are disclosed.

---

Polymers and copolymers of 5-vinyltetrazole have been produced by the reaction of an acrylonitrile polymer with an azide at 100–130° C. for about 24 hours. U. S. Patent No. 3,096,312, for instance, discloses such polymers and hydrazine salts thereof and suggests their use as binders for solid propellants.

We have now found that we can produce triaminoguanidinium salts of said polymers. We have further discovered that these triaminoguanidinium salts possess a unique combination of properties, i.e., they have a high gas-forming capability, a high stability and a high nitrogen content. They therefore can be utilized as gas-formers as well as binders in the preparation of rocket propellants. In this manner, the amount of extraneous gasforming materials or binders which must be added to rocket propellants is materially reduced or negated altogether, thereby resulting in more efficient rocket propellants.

It is therefore an object of the present invention to provide triaminoguanidinium salts of 5-vinyltetrazole polymers and a method for the production thereof.

It is a further object of the present invention to provide rocket propellant compositions containing a triaminoguanidinium salt of a homopolymer or copolymer of 5-vinyltetrazole.

In accordance with the present invention, triaminoguanidinium salts of polymers of 5-vinyltetrazole can be produced by contacting the polymer, in an aqueous slurry and under an inert atmosphere, with one equivalent of the free base, triaminoguanidine at from about −20° C. to 50° C. As salt is formed, the polymer dissolves. Vacuum evaporation of the reaction media leaves the triaminoguanidinium salt of the polymer as residue.

Before contacting the polymer with the triaminoguanidine, the triaminoguanidine, if colored, should be washed with methanol until it is white. It should also preferably be weighed out in a dry box in an inert atmosphere and methanol added before exposing it to air and moisture.

The triaminoguanidinium salts of the 5-vinyltetrazole polymers produced herein have the formula (I) 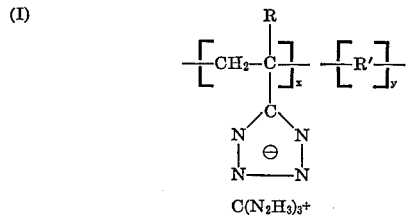

wherein R is hydrogen, a methyl, tetrazole or nitrile group, R' is the polymerization residue of a monomer comprising a vinyl halide, acrylonitrile, methacrylonitrile, vinylidene cyanide, a styrene, a vinyl ether, an acrylate, a methacrylate, an olefin or a vinyl ester and $x$ and $y$ are the number of recurring units in the polymer, the ratio of $x$ to $y$ ranging from about 1:0 to 1:1.

Thus it can be seen that the 5-vinyl tetrazolate polymer can be a homopolymer thereof or a copolymer thereof with up to 50% of a monomer copolymerizable therewith. The polymers generally have a molecular weight ranging from about 5,000 to 1,000,000, the specific molecular weight of any specific polymer, however, not being critical.

As can be seen from the above-identified U.S. patent, the 5-aminotetrazole polymer is prepared from a nitrilecontaining monomer. Hence, as represented by R above, the nitrile-containing monomer can be acrylonitrile, methacrylonitrile and vinylidene cyanide, R being hydrogen, a methyl or a nitrile group, respectively, the nitrile group remaining from the incomplete tetrazolation of a vinylidene cyanide homopolymer. When tetrazolation is complete, R, of course, will be a tetrazole radical.

Monomers which can be copolymerized with the above monomers include vinyl chloride, vinyl bromide, vinyl fluoride, vinyl iodide, styrene, o-m- and p-halostyrenes, o-m- and p-alkyl styrenes, α-methyl styrene, α-methyl-p-methyl styrene, etc., ethyl vinyl ether, diallyl ether, ethyl methallyl ether, etc., ethylene, propylene, etc., vinyl acetate, vinyl propionate, vinyl benzoate, etc., and the alkyl acrylate and methacrylates such as methyl acrylate, ethyl acrylate, propyl acrylate, n-t- or isobutyl acrylate, amyl acrylate, and cyclohexyl acrylate, methyl methacrylate and the like.

When these monomers are copolymerized with the acrylonitrile, methacrylonitrile or vinylidene cyanide, the resultant copolymer will conform in structure to Formula I, R¹, of course, representing the polymerization residue of the comonomer. In instances where the tetrazolation of a homopolymer is incomplete, however, R¹ will represent the non-reacted units of the homopolymer. Thus, in the case of poly(acrylonitrile), if tetrazolation is 90% complete, R¹ will represent an acrylonitrile polymerization residue, the ratio of $x$ to $y$ being 1 to 0.11. Similarly, in incomplete tetrazolation of methacrylonitrile and vinylidene cyanide homopolymers, R¹ will represent methacrylonitrile and vinylidene cyanide polymerization residues, respectively.

The preferred starting material with which the triaminoguanidine free base is reacted is homopolymeric 5-vinyl tetrazole, i.e., the polymer represented by Formula I, wherein R is hydrogen, and the ratio of $x$ to $y$ is 1:0.

The scope of the invention is also meant to include bis(triaminoguanidinium) salts, i.e., those polymers having the formula

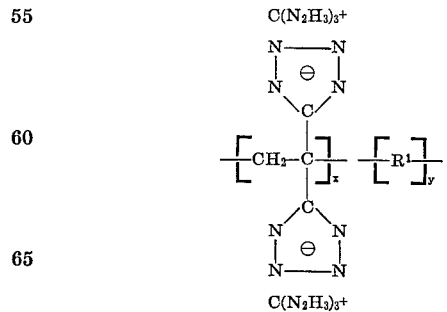

wherein R¹, and $x$ and $y$ are as defined above in regard to Formula I.

That is to say, when the starting polymer with which the azide is contacted to produce the tetrazole is produced from vinylidene cyanide, according to the above disclosed Henry patent, both cyanide groups are converted to tetrazole rings. Then, according to the process of the instant invention salts of each tetrazole group are formed by reacting the polymer with two equivalents of the triaminoguanidine. When materials of this type are produced it is preferred that the ratio of $x$ to $y$ in the starting copolymer be substantially 1:1.

The following examples are set forth by way of illustration only and are not to be construed as limiting the instant invention except as set forth in the appended claims. All parts and percentages are by weight unless otherwise specified.

Example 1

7 parts of poly(5-vinyltetrazole), which by nitrogen analysis contains 94% vinyl tetrazole and 6% acrylonitrile units, are slurried in 125 parts of water at 0°–10° C. under nitrogen and contacted with 7.21 parts of the free base, triaminoguanidine. The pH falls to 9.5 after 30 minutes and 8.0 after 12 hours. An additional 0.025 part of polymer is then added to create a pH of 7.6. The solution is then stripped to near dryness in a vacuum evaporator and further dried in an oven for 18 hours at 80° C. The yield of polymer salt is about 100%.

*Analysis.*—Calculated for salt: C, 24.80; H, 6.05; N, 69.15. Found: C, 24.22; H, 5.88; N, 69.27.

The salt has the following properties:

Softening point: 138° C.;
X-ray: Amorphous;
Intrinsic viscosity: 0.84 at 23° C. in water;
Impact sensitivity: 140 cm./2 kg.;
Electrostatic discharge: 6.56 joules;
Autoignition: 300° C.;
Thermal gravimetric analysis: 50% weight loss at 150–200° C. at 10° C./min. rise in both air and nitrogen;
Heat of formation: approximately 87 kcal./mole Example 2

Following the procedure of Example 1 except that the polymer charge contains 100% vinyl tetrazole by analysis, a triaminoguanidinium salt of comparable properties is recovered in 99% yield.

Examples 3–12

Following the procedure of Example 1, triaminoguanidinum salts of the following polymers are prepared in high yields. In each instance, the polymer salts have properties conducive to their use as propellant additives.

(3) A copolymer of 5-vinyltetrazole and styrene having a ratio of tetrazole to styrene of 1 to 0.43.

(4) A copolymer of 5-vinyltetrazole and vinyl chloride having a ratio of tetrazole to chloride of 1 to 0.18.

(5) A copolymer of 5-vinyltetrazole and ethyl vinyl ether having a ratio of tetrazole to ether of 1 to 0.052.

(6) A copolymer of 5-vinyltetrazole and ethyl acrylate having a ratio of tetrazole to acrylate of 1 to 0.25.

(7) A copolymer of 5-vinyltetrazole and methyl methacrylate having a ratio of terazole to methacrylate of 1 to 0.25.

(8) A copolymer of 5-vinyltetrazole and ethylene having a ratio of tetrazole to ethylene of 1 to 0.052.

(9) A copolymer of 5-vinyltetrazole and vinyl acetate having a ratio of tetrazole to acetate of 1 to 0.11.

10) A homopolymer of 100% tetrazolated poly(methacrylonitrile).

(11) A copolymer of vinylidene cyanide and vinyl acetate which is 100% tetrazolated, the ratio of the monomers being 1 to 1,

(12) A copolymer of vinylidene cyanide and vinyl acetate which is 50% tetrazolated, the ratio of the monomers being 1 to 1.

As mentioned above, the triaminoguanidinium salts of the instant invention possess properties which make them highly useful as a component in both solid and hybrid rocket propellant fuel compositions. They combine the binder properties of known polymer binders with the properties of high stability and, high gas-forming capability, thereby resulting, when mixed with various oxidizers, etc. in propellants of excellent specific impulse. Furthermore, they have a high nitrogen content and show no measurable impact or electrical sensitivity.

The triaminoguanidinium salts of the instant invention can be incorporated as an ingredient into propellant composition in accordance with general procedures well known to those skilled in the art. Conventional oxidizers such as nitric acid, oxygen, ammonium perchlorate, potassium perchlorate, sodium perchlorate, ammonium nitrate, etc. may be used. One may add extraneous gas-forming compounds if desired, but they are generally unnecessary, as are extraneous binders. Fulers such as aluminum, beryllium, boron and the like may also be added.

Further details concerning production and formulation of such composition can be found in U.S. Patent Numbers 2,622,277, 2,646,596 and 3,132,978 which patents are hereby incorporated herein by reference.

I claim:
1. Polymers having the formula

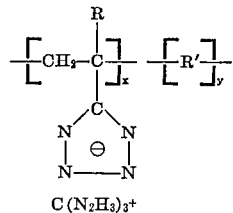

wherein R is selected from the group consisting of hydrogen, methyl, tetrazole and nitrile radicals, R′ is the polymerization residue of a monomer selected from the group consisting of acrylonitrile, methacrylonitrile, vinylidene cyanide, a vinyl halide, a styrene, a vinyl ether, an alkyl acrylate, an alkyl methacrylate, an α-mono olefin and a vinyl ester, and $x$ and $y$ are the number of recurring units in the polymer, the ratio of $x$ to $y$ ranging from about 1:0 to 1:1.

2. A polymer according to claim 1 wherein R is hydrogen, and the ratio of $x$ to $y$ is 1:0.

3. A method of producing a polymer of claim 1 which comprises
  (a) forming an aqueous slurry of a polymer having the formula

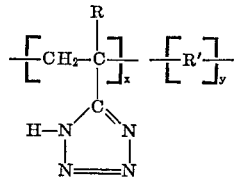

wherein R is selected from the group consisting of hydrogen, methyl, tetrazole and nitrile radicals, R′ is the polymerization residue of a monomer selected from the group consisting of acrylonitrile, methacrylonitrile, vinylidene cyanide, a vinyl halide, a styrene, a vinyl ether, an alkyl acrylate, an alkyl methacrylate, an α-mono olefin and a vinyl ester, and $x$ and $y$ are the number of recurring units in the polymer, the ratio of $x$ to $y$ ranging from about 1:0 to 1:1.
  (b) containing said slurry with the free base, triaminoguanidine,
  (c) evaporating the resulting media to dryness and
  (d) recovering the resultant residue.

4. A method according to claim 3 wherein R is hydrogen and the ratio of $x$ to $y$ is 1:0.

References Cited

UNITED STATES PATENTS

| | | | |
|---|---|---|---|
| 3,004,959 | 10/1961 | Finnegan et al. | 260—88.3 |
| 3,036,086 | 5/1962 | Adicoff | 260—88.3 |
| 3,055,911 | 9/1962 | Finnegan et al. | 260—88.3 |
| 3,096,312 | 7/1963 | Henry | 260—88.3 |

JOSEPH L. SCHOFER, *Primary Examiner.*

HARRY WONG, *Assistant Examiner.*